United States Patent
Seo et al.

(10) Patent No.: US 9,860,023 B2
(45) Date of Patent: Jan. 2, 2018

(54) METHOD AND DEVICE FOR RECEIVING ACK/NACK IN WIRELESS COMMUNICATION SYSTEM

(71) Applicant: LG ELECTRONICS INC., Seoul (KR)

(72) Inventors: Dongyoun Seo, Seoul (KR); Hakseong Kim, Seoul (KR); Yunjung Yi, Seoul (KR); Joonkui Ahn, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/776,176

(22) PCT Filed: Mar. 14, 2014

(86) PCT No.: PCT/KR2014/002173
§ 371 (c)(1),
(2) Date: Sep. 14, 2015

(87) PCT Pub. No.: WO2014/142603
PCT Pub. Date: Sep. 18, 2014

(65) Prior Publication Data
US 2016/0043831 A1      Feb. 11, 2016

Related U.S. Application Data

(60) Provisional application No. 61/786,457, filed on Mar. 15, 2013.

(51) Int. Cl.
*H04L 1/08*      (2006.01)
*H04L 1/16*      (2006.01)

(52) U.S. Cl.
CPC ............. *H04L 1/08* (2013.01); *H04L 1/1607* (2013.01)

(58) Field of Classification Search
CPC ........... H04W 72/0413; H04W 72/042; H04W 88/02; H04W 8/005; H04W 72/0406;
(Continued)

(56) References Cited

U.S. PATENT DOCUMENTS 8,804,812 B2 *   8/2014  Seo .................. H04L 1/1861
                                                    375/240
8,902,841 B2 *  12/2014  Suzuki ................ H04L 5/0051
                                                    370/252
(Continued)

FOREIGN PATENT DOCUMENTS

CA    WO 2012174213 A1 *  12/2012  ............... H04L 1/18
CN      102823182 A       12/2012
(Continued)

OTHER PUBLICATIONS

Intel Corporation, "On PUCCH Sequences and Resource Allocation for UL CoMP", R1-123179, 3GPP TSG-RAN WG1 Meeting #70, Qingdao, China, Aug. 13-17, 2012, pp. 1-5.
(Continued)

*Primary Examiner* — Cynthia Britt
(74) *Attorney, Agent, or Firm* — Birch, Stewart, Kolasch & Birch, LLP

(57) ABSTRACT

Provided are a method by which a terminal receives ACK/NACK in a wireless communication system and the terminal using the method. The method comprises: transmitting data through a PUSCH; and receiving ACK/NACK for the data, wherein the ACK/NACK is received through downlink control information (DCI).

9 Claims, 17 Drawing Sheets

(58) Field of Classification Search
CPC ......... H04W 72/1273; H04W 72/1278; H04W 72/14; H04W 48/12; H04L 5/0055; H04L 1/00; H04L 1/1864; H04L 1/08; H04L 1/1607
USPC .................................. 714/748, 749; 370/329
See application file for complete search history.

(56) References Cited

U.S. PATENT DOCUMENTS

| | | | |
|---|---|---|---|
| 9,112,692 B2 * | 8/2015 | Chen | H04L 1/1861 |
| 9,113,458 B2 * | 8/2015 | Lee | H04L 1/1607 |
| 9,307,525 B2 * | 4/2016 | Lee | H04L 1/0029 |
| 9,549,396 B2 * | 1/2017 | Lee | H04L 1/1607 |
| 2011/0206014 A1 | 8/2011 | Lee et al. | |
| 2012/0236812 A1 | 9/2012 | Chen et al. | |
| 2012/0294270 A1 | 11/2012 | Yamada et al. | |
| 2012/0307775 A1 | 12/2012 | Chung et al. | |
| 2013/0064216 A1 * | 3/2013 | Gao | H04L 5/0016 370/330 |
| 2013/0114570 A1 | 5/2013 | Park et al. | |
| 2013/0163543 A1 * | 6/2013 | Freda | H04W 72/0406 370/329 |
| 2013/0194980 A1 * | 8/2013 | Yin | H04L 1/1854 370/280 |
| 2014/0161002 A1 * | 6/2014 | Gauvreau | H04W 16/24 370/280 |
| 2014/0192757 A1 * | 7/2014 | Lee | H04L 1/1861 370/329 |
| 2014/0204854 A1 * | 7/2014 | Freda | H04L 1/18 370/329 |
| 2014/0376456 A1 | 12/2014 | Kim et al. | |
| 2016/0128052 A1 | 5/2016 | Ouchi et al. | |

FOREIGN PATENT DOCUMENTS

| | | | | |
|---|---|---|---|---|
| EP | 2757725 A1 | 7/2014 | | |
| JP | 2011-155336 A | 8/2011 | | |
| JP | 2013-17016 A | 1/2013 | | |
| KR | WO 2012070831 A2 * | 5/2012 | ........... | H04L 1/0029 |
| WO | WO 2012/023819 A2 | 2/2012 | | |
| WO | WO 2012/060628 A2 | 5/2012 | | |
| WO | WO 2013/009035 A2 | 1/2013 | | |

OTHER PUBLICATIONS

Samsung, "Issues on Phich-less PUSCH HARQ operation in TDD CA", R1-123453, 3GPP TSG RAN WG1 #70, Qingdao, China, Aug. 13-17, 2012, pp. 1-4.

ZTE, "Issues for Non-standalone New Carrier Type", R1-124832, 3GPP TSG-RAN WG1 Meeting #71, New Orleans, USA, Nov. 12-16, 2012, pp. 1-2.

LG Electronics, "Considerations on Other Control Channels," 3GPP TSG RAN WG1 Meeting #69, Prague, Czech Republic, May 21-25, 2012 (retrieved May 12, 2012), R1-122315, pp. 1-4.

LG Electronics, "PHICH for New Carrier Type," 3GPP TSG RAN WG1 Meeting #72, St Julian's, Malta, Jan. 28-Feb. 1, 2013 (retrieved Jan. 18, 2013), R1-130256, 3 pages.

Renesas Mobile Europe Ltd., "On the need of PHICH enhancements," 3GPP TSG-RAN WG1 Meeting #69, Prague, Czech Republic, May 21-25, 2012 (retrieved May 12, 2012), R1-122361, 7 pages.

* cited by examiner

FIG. 15

DCI 0 | PHICH group 0 | 0 1 2 3 4 5 6 7 | PHICH group 1 | 0 1 2 3 4 5 6 7 | PHICH group 2 | 0 1 2 3 4 5 6 7 | CRC scramble with HI-RNTI 0

DCI 1 | PHICH group 3 | 0 1 2 3 4 5 6 7 | PHICH group 4 | 0 1 2 3 4 5 6 7 | PHICH group 5 | 0 1 2 3 4 5 6 7 | CRC scramble with HI-RNTI 1

METHOD AND DEVICE FOR RECEIVING ACK/NACK IN WIRELESS COMMUNICATION SYSTEM

CROSS REFERENCE TO RELATED APPLICATIONS:

This application is the National Phase of PCT/KR2014/002173 filed on Mar. 14, 2014, which claims priority under 35 U.S.C. 119(e) to U.S. Provisional Application No. 61/786,457 filed on Mar. 15, 2013, all of which are hereby expressly incorporated by reference into the present application.

BACKGROUND OF THE INVENTION

Field of the Invention

The present invention relates to wireless communication and, more particularly, to a method of receiving acknowledgement/not-acknowledgement (ACK/NACK) in a wireless communication system and an apparatus using the method.

Related Art

In a wireless communication system, a hybrid automatic repeat request (HARQ) may be applied between a transmitter and a receiver. The HARQ is a signal transmission/reception method of checking whether data received in a physical layer includes an error that is unable to be decoded and requesting retransmission when an error occurs. In a process of performing an HARQ, a receiver sends not-acknowledgement (NACK) through a control channel if an error occurs and sends acknowledgement (ACK) through a control channel if an error does not occur. In a prior art, a base station has sent ACK/NACK for data transmitted by a terminal through a channel called a "physical hybrid ARQ indicator channel (PHICH)."

Meanwhile, in the future wireless communication system, a new carrier type (NCT) may be used. The NCT may use a channel structure different from a channel structure used in an existing legacy carrier type (LCT). For example, the NCT may not include a PHICH included in the LCT.

Furthermore, an enhanced-PHICH (E-PHICH) may be used in the existing LCT or the NCT instead of a PHICH. The PHICH is placed in a physical downlink control channel (PDCCH) region, whereas the E-PHICH may be placed outside the PDCCH region.

If a PHICH is not present as in the NCT or ACK/NACK is transmitted through an E-PHICH which may be placed outside the PDCCH region, it is difficult to use a conventional method of sending ACK/NACK through a PHICH without a change.

SUMMARY OF THE INVENTION

The present invention provides a method and apparatus for receiving ACK/NACK in a wireless communication system In one aspect, provided is a method of receiving, by a terminal, acknowledgement/not-acknowledgement (ACK/NACK) in a wireless communication system. The method includes sending data through a physical uplink shared channel (PUSCH), and receiving ACK/NACK for the data, wherein the ACK/NACK is received through downlink control information (DCI).

The DCI may comprise a hybrid automatic repeat request indicator (HI) bit field in which a plurality of ACK/NACKs to be transmitted to a plurality of terminals is able to be multiplexed and a cyclic redundancy check (CRC) field.

The ACK/NACK for the terminal may be placed in a specific bit of the HI bit field.

The specific bit may be determined based on a minimum resource block index forming the PUSCH and a demodulation reference signal (DMRS) cyclic shift value included in an uplink grant which schedules the PUSCH.

The CRC field may comprise CRC scrambled with a radio network temporary indicator (RNTI).

A location of the ACK/NACK within the DCI may be identified based on an index indicative of the RNTI and an index indicative of the specific bit in the HI bit field.

If the data comprises two codewords, two ACK/NACKs for the two codewords may be received within identical DCI.

In another aspect, a terminal is provided. The terminal includes an RF unit sending and receiving radio signals and a processor connected to the RF unit. The processor sends data through a physical uplink shared channel (PUSCH) and receives ACK/NACK for the data, and the ACK/NACK is received through downlink control information (DCI).

A base station does not send ACK/NACK for data transmitted by a terminal through a PHICH which may be called an ACK/NACK-dedicated channel, but may send the ACK/NACK within a common control channel in a DCI form. In this case, ACK/NACKs for a plurality of terminals may be multiplexed and transmitted. The present invention provides a method of efficiently recognizing, by each terminal, its own ACK/NACK. Accordingly, the present invention can be applied to a carrier in which a PHICH is unable to be used, for example, an NCT not including a PHICH.

BRIEF DESCRIPTION OF THE DRAWINGS

FIG. 15 shows an example of another method of indicating a specific bit field within DCI in accordance with an embodiment of the present invention.

DESCRIPTION OF EXEMPLARY EMBODIMENTS

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with a system based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using Evolved-UMTS Terrestrial Radio Access (E-UTRA). 3GPP LTE adopts OFDMA in downlink and adopts SC-FDMA in uplink. LTE-Advanced (A) is the evolution of 3GPP LTE. In order to clarify a description, a situation in which the present invention is applied to an LTE-A system is assumed, but the technical spirit of the present invention is not limited thereto.

Figure 1:
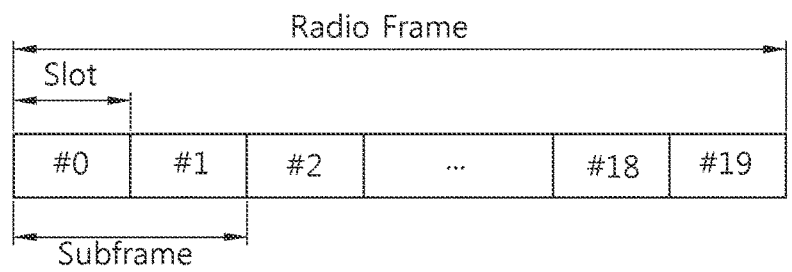
FIG. 1 shows the structure of a radio frame in 3GPP LTE.

FIG. 1 shows the structure of a radio frame in 3GPP LTE.

Referring to FIG. 1, the radio frame includes 10 subframes, and each of the subframes includes 2 slots. The slots within the radio frame are given slot numbers from #0 to #19. The time that is taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms.

The structure of the radio frame is only an example. Accordingly, the number of subframes included in the radio frame or the number of slots included in the subframe can be changed in various ways.

Figure 2:
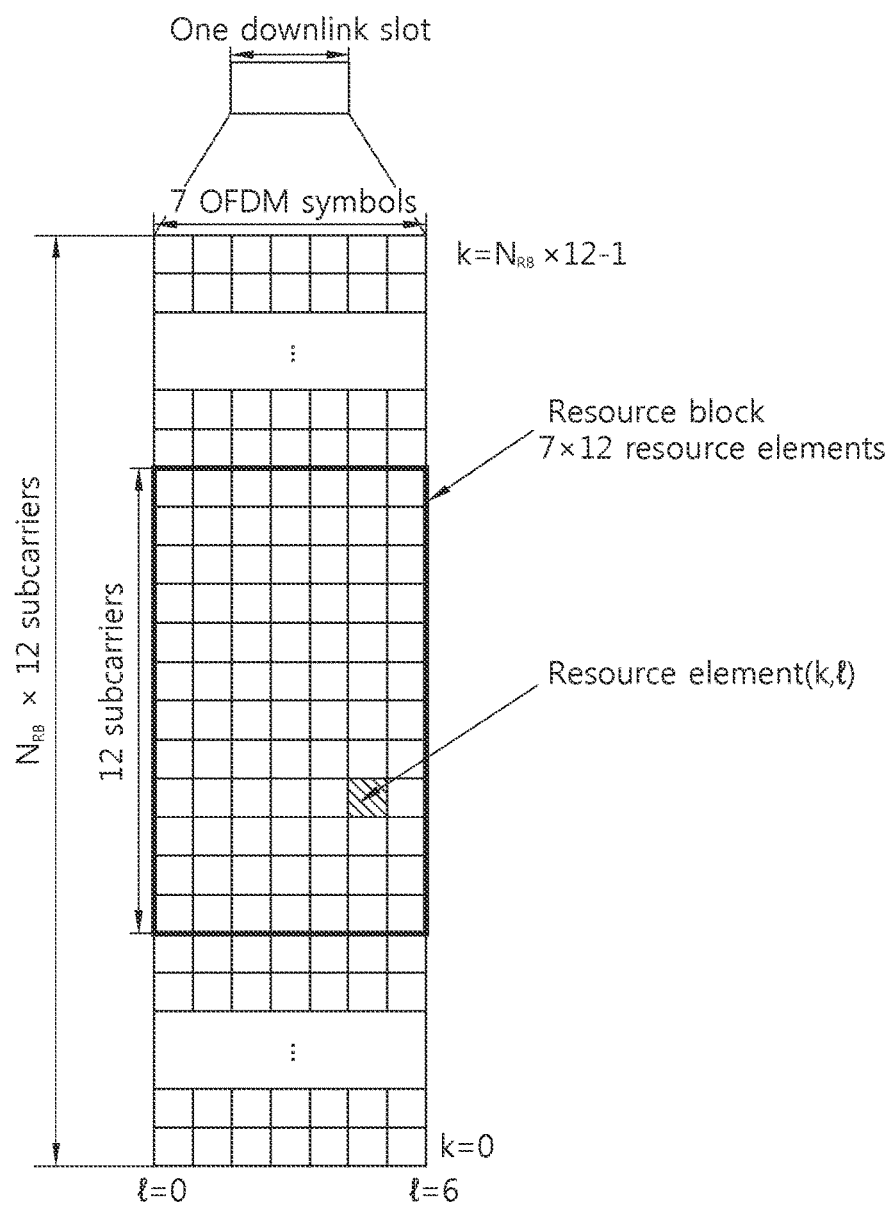
FIG. 2 shows an example of a resource grid for one slot.

FIG. 2 shows an example of a resource grid for one slot.

The slot includes a downlink slot and an uplink slot. The downlink slot includes a plurality of Orthogonal Frequency Division Multiplexing (OFDM) symbols in a time domain. The OFDM symbol indicates a specific time interval, and the OFDM symbol may also be called an SC-FDMA symbol depending on a transmission method. The downlink slot includes an $N_{RB}$ number of Resource Blocks (RBs) in a frequency domain. The RB is a resource allocation unit, and the RB includes one slot in the time domain and a plurality of contiguous subcarriers in the frequency domain.

The number of RBs $N_{RB}$ included in the downlink slot depends on a downlink transmission bandwidth configured in a cell. For example, in an LTE system, the number $N_{RB}$ can be any one of 6 to 110. An uplink slot can have the same structure as the downlink slot.

Each element on the resource grid is called a Resource Element (RE). An RE on the resource grid can be identified by an index pair (k,l) within a slot. Here, k(k=0, . . . , $N_{RB}\times12-1$) is a subcarrier index within the frequency domain, and l (l=0, . . . , 6) is an OFDM symbol index within the time domain.

One RB is illustrated as including 7×12 REs, including 7 OFDM symbols in the time domain and 12 subcarriers in the frequency domain, but the number of OFDM symbols and the number of subcarriers within one RB are not limited thereto. The number of OFDM symbols and the number of subcarriers can be changed in various ways depending on the length of a CP, frequency spacing, etc. For example, in the case of a normal Cyclic Prefix (CP), the number of OFDM symbols is 7 and in the case of an extended CP, the number of OFDM symbols is 6. In one OFDM symbol, one of 128, 256, 512, 1024, 1536, and 2048 can be selected and used as the number of subcarriers.

Figure 3:
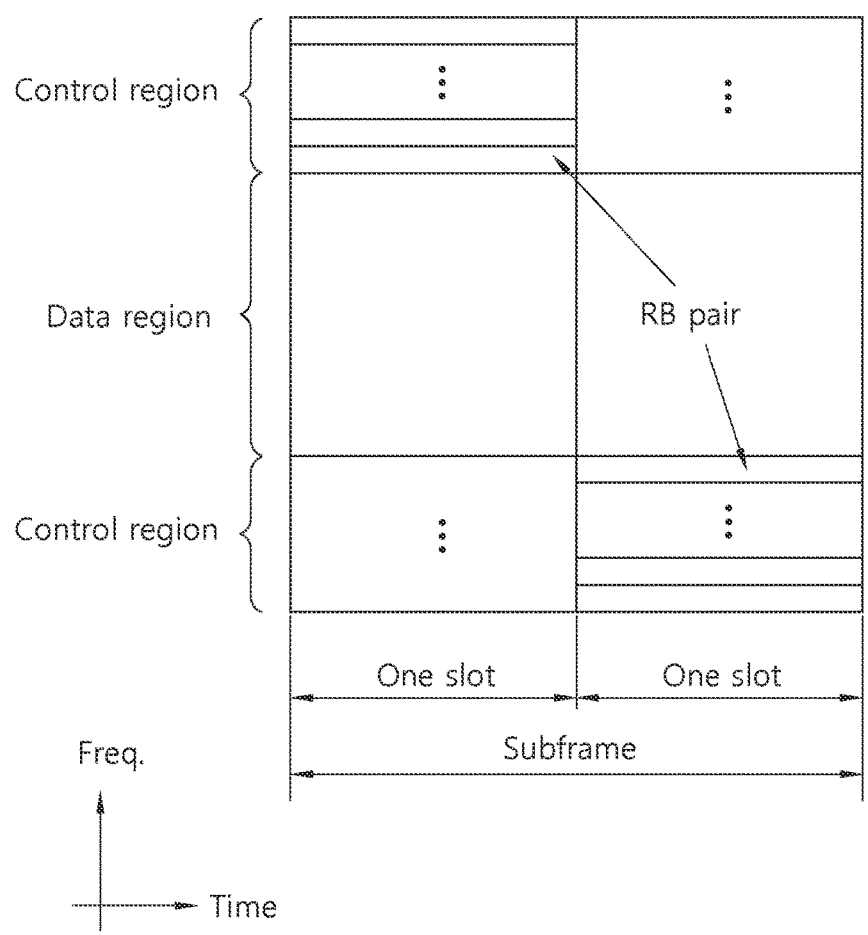
FIG. 3 shows the structure of an uplink subframe.

FIG. 3 shows the structure of an uplink subframe.

The uplink subframe can be divided into a control region and a data region in a frequency domain. Physical uplink control channels (PUCCHs) on which uplink control information is transmitted are allocated to the control region. Physical uplink shared channels (PUSCHs) through which data is transmitted are allocated to the data region. A terminal (user equipment: UE) may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of a slot boundary. This is called that the RB pair allocated to the PUCCH has been frequency-hopped in the slot boundary. A terminal can obtain a frequency diversity gain by sending uplink control information through different subcarriers over time.

Uplink control information transmitted on a PUCCH includes ACK/NACK, Channel State Information (CSI) indicative of a downlink channel state, a Scheduling Request (SR), that is, an uplink radio resource allocation request, etc. The CSI includes a Precoding Matrix Index (PMI) indicative of a precoding matrix, a Rank Indicator (RI) indicative of a rank value that is preferred by UE, a Channel Quality Indicator (CQI) indicative of a channel state, etc.

A PUSCH is mapped to an uplink shared channel (UL-SCH), that is, a transport channel. Uplink data transmitted on the PUSCH can be a transmission block, that is, a data block for an UL-SCH that is transmitted during a TTI. The transmission block can be user information. Alternatively, the uplink data can be multiplexed data. The multiplexed data can be obtained by multiplexing the transmission block for the UL-SCH and control information. For example, control information multiplexed with data can include a CQI, a PMI, ACK/NACK, an RI, etc. Alternatively, the uplink data may include only control information.

Figure 4:
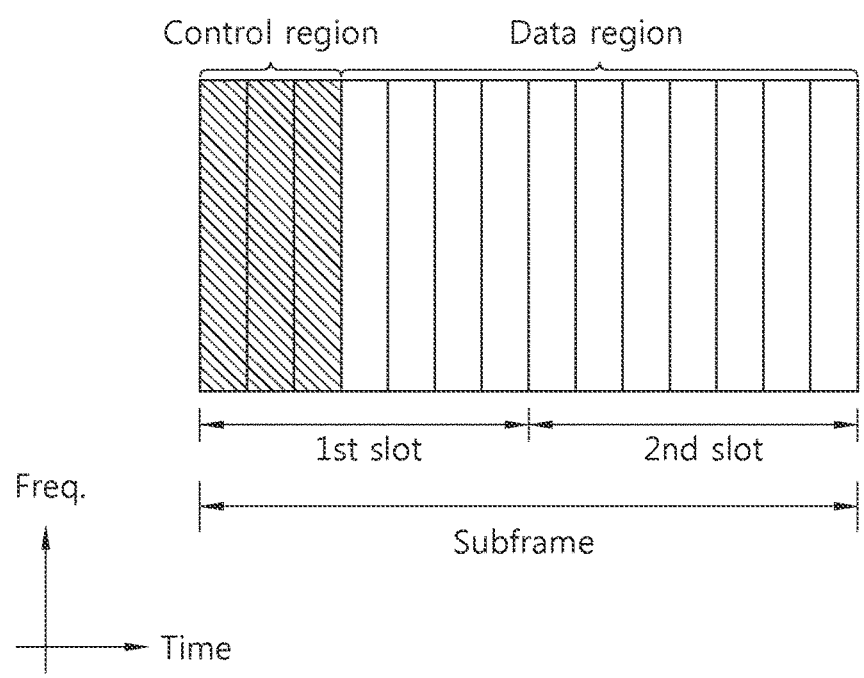
FIG. 4 shows the structure of a downlink subframe.

FIG. 4 shows the structure of a downlink subframe.

The downlink subframe includes two slots in a time domain, and each of the slots includes 7 OFDM symbols in a normal CP. A maximum of former 3 OFDM symbols (i.e., a maximum of 4 OFDM symbols for a 1.4 MHz bandwidth) in the first slot within the downlink subframe corresponds to a control region to which control channels are allocated, and the remaining OFDM symbols correspond to a data region to which Physical Downlink Shared Channels (PDSCHs) are allocated. The PDSCH means a channel on which data is transmitted from a BS or a node to UE.

Control channels transmitted in the control region include a physical control format indicator channel (PCFICH), a physical hybrid-ARQ indicator channel (PHICH), and a physical downlink control channel (PDCCH).

A PCFICH transmitted in the first OFDM symbol of the subframe carries a Control Format Indicator (CFI), that is, information about the number of OFDM symbols (i.e., the size of the control region) that is used to send control channels within the subframe. A terminal first receives a CFI on a PCFICH and then decodes a PDCCH. Unlike a PDCCH, a PCFICH does not use blind decoding, and the PCFICH is transmitted through the fixed PCFICH resource of a subframe.

A PHICH carries an acknowledgement (ACK)/not-acknowledgement (NACK) signal for an uplink Hybrid Automatic Repeat request (HARQ). An ACK/NACK signal for uplink data transmitted by UE is transmitted through a PHICH. The PHICH is described in detail later.

A PDCCH is a control channel on which Downlink Control Information (DCI) is transmitted. The DCI can include the allocation of PDSCH resources (also called downlink grant (DL grant)), the allocation of physical uplink shared channel (PUSCH) resources (also called an uplink grant (UL grant)), a set of transmit power control commands for individual UEs within a specific terminal group and/or the activation of a Voice over Internet Protocol (VoIP).

Figure 5:
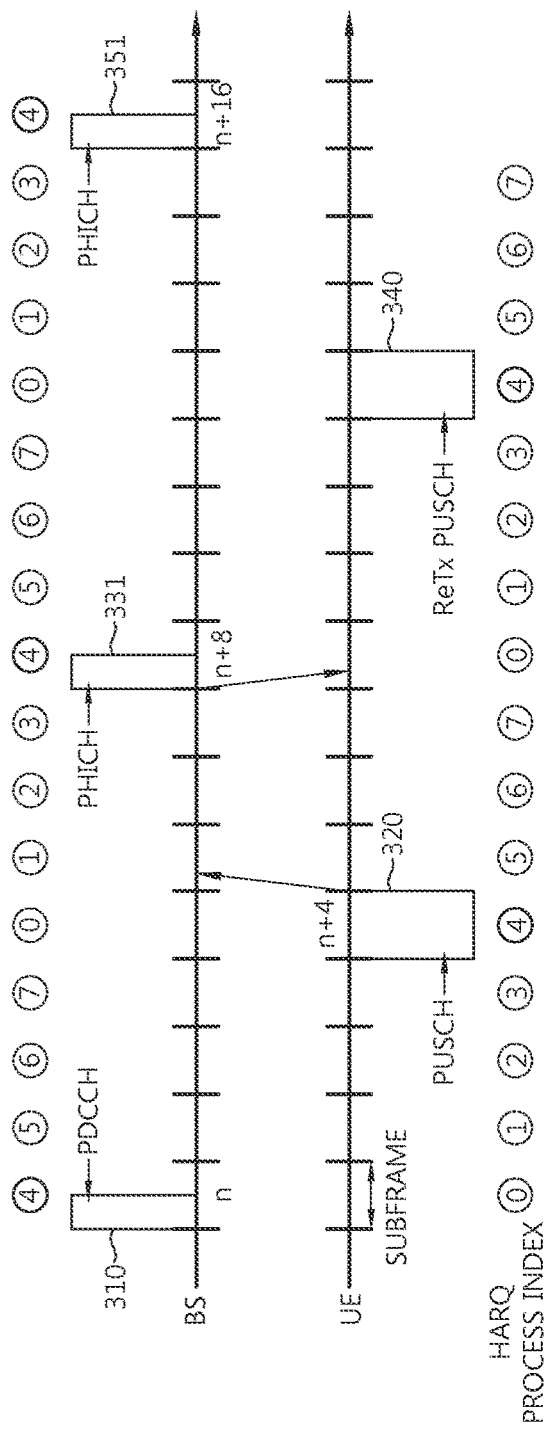
FIG. 5 shows an example of a method of performing an uplink HARQ.

FIG. 5 shows an example of a method of performing an uplink HARQ.

A terminal receives the allocation of initial uplink resources on a PDCCH 310 in an $n^{th}$ subframe from a BS.

The terminal sends uplink data, more particularly, an uplink transmission block on a PUSCH 320 in an $(n+4)^{th}$ subframe using the allocation of the initial uplink resources.

The BS sends an ACK/NACK signal for the uplink transmission block on a PHICH 331 in an $(n+8)^{th}$ subframe. The ACK/NACK signal indicates the confirmation of the reception of the uplink transmission block, the ACK signal indicates successful reception, and the NACK signal indicates unsuccessful reception.

The terminal which has received the NACK signal sends a retransmission block on a PUSCH 340 in an $(n+12)^{th}$ subframe.

The BS sends an ACK/NACK signal for the uplink transmission block on a PHICH 351 in an $(n+16)^{th}$ subframe.

After initial transmission in the $(n+4)^{th}$ subframe, the retransmission is performed in the $(n+12)^{th}$ subframe. Accordingly, an HARQ is performed using 8 subframes as an HARQ cycle.

In 3GPP LTE, 8 HARQ processes can be performed. The HARQ processes are assigned indices from 0 to 7. The aforementioned example shows that an HARQ in an HARQ process index 4.

A PHICH is described in detail below.

As described above, a PHICH is a control channel that carries an ACK/NACK signal for uplink data transmitted by UE. A plurality of PHICHs can be mapped to a set of the same resource elements that form a PHICH group. The PHICHs within the same PHICH group are distinguished by different orthogonal sequences. A resource on which a PHICH is transmitted is called a PHICH resource. The PHICH resource is identified by an index pair, such as $(n^{group}_{PHICH}, n^{seq}_{PHICH})$. $n^{group}_{PHICH}$ indicates a PHICH group index, and $n^{seq}_{PHICH}$ indicates an index of an orthogonal sequence within the PHICH group.

The following equation indicates an index pair indicative of a PHICH resource.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad \text{[Equation 1]}$$

In Equation 1, $I_{PRB\_RA}^{lowest\_index}$ is a minimum Physical Resource Block (PRB) index of the first slot of a corresponding PUSCH, and $n_{DMRS}$ is a value indicative of the cyclic shift of a demodulation reference signal (DMRS) in the corresponding PUSCH. The DMRS refers to an RS used to demodulate data that is transmitted on a PUSCH. Furthermore, $N^{group}_{PHICH}$ indicates the number of PHICH groups, $N^{PHICH}_{SF}$ indicates a spreading factor for PHICH demodulation, and $I_{PHICH}$ is a value having 1 or 0. PUSCH transmission is performed in a subframe n=4 or 9 (n is one of 0 to 9, and n is 4 or 9). If a Time Division Duplex (TDD) uplink-downlink configuration (UL-DL configuration) is 0, $I_{PHICH}$ is 1. In other cases, $I_{PHICH}$ is 0.

In a radio frame used in Frequency Division Duplex (FDD), the number of PHICH groups $N^{group}_{PHICH}$ is a constant regarding all subframes and given as follows.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 2]}$$

Here, $N_g \in \{1/6, 1/2, 1, 2\}$ and is given through a higher layer signal. An index $n^{group}_{PHICH}$ in Equation 1 has a range from 0 to $N^{group}_{PHICH}-1$.

In a radio frame used in Time Division Duplex (TDD), the number of PHICH groups can be changed in various ways between downlink subframes. The number of PHICH groups can be given as '$m_i \cdot N^{group}_{PHICH}$'. $m_i$ can be given as in the following table. Furthermore, $N^{group}_{PHICH}$ can be given as in Equation 2, and an index $n^{group}_{PHICH}$ can have a range of 0 to $m_i \cdot N^{group}_{PHICH}-1$ in relation to a downlink subframe having a PHICH resource.

TABLE 1

| UL-DL configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Figure 6:
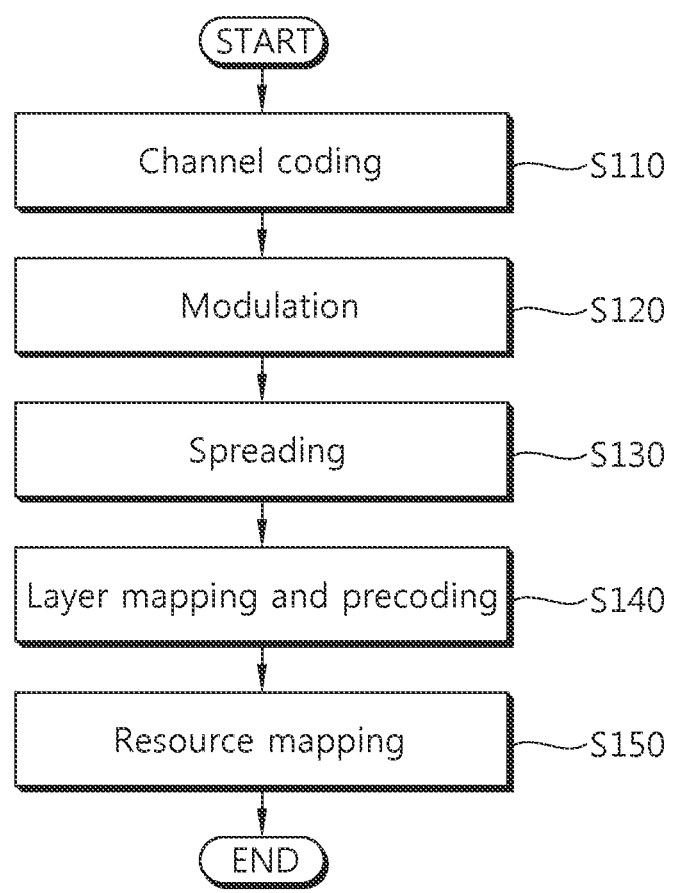
FIG. 6 shows an example of a process of configuring PHICHs.

FIG. 6 shows an example of a process of configuring PHICHs.

At step S110, channel coding is performed on an ACK/NACK signal using repetition coding according to a coding rate.

At step S120, the channel-coded ACK/NACK signal is mapped to modulation symbols through Binary Phase Shift Keying (BPSK) modulation. At step S130, the modulation symbols are spread using a Spreading Factor (SF) $N^{PHICH}_{SF}$ and an orthogonal sequence.

For example, if a bit stream to be transmitted through one PHICH within one subframe is $b(0), \ldots, b(M_{bit}-1)$, the bit stream is subject to Binary Phase Shift Keying (BASK) modulation and thus generated into modulation symbols $z(0), \ldots, z(M_s-1)$ having a complex value. Here, $M_s = M_{bit}$.

The modulation symbols $z(0), \ldots, z(M_s-1)$ are multiplied by an orthogonal sequence symbol-wise as in the following equation and scrambled, so modulation symbols $d(0), \ldots, d(M_{symb}-1)$ are generated as in the following equation.

$$d(i) = w(i \bmod N_{SF}^{PHICH}) \cdot (1 - 2c(i)) \cdot z(\lfloor i/N_{SF}^{PHICH} \rfloor) \quad \text{[Equation 3]}$$

$$i = 0, \ldots, M_{symb} - 1$$

$$M_{symb} = N_{SF}^{PHICH} \cdot M_s$$

where $$N_{SF}^{PHICH} = \begin{cases} 4 & \text{normal cyclic prefix} \\ 2 & \text{extended cyclic prefix} \end{cases}$$

Furthermore, c(i) is a cell-specific scrambling sequence and can be given as in Paragraph 7.2 of 3GPP TS 36.211 V9.1.0. An initial value $c_{init}$ of c(i) for each subframe is given as in the following equation.

$$c_{init} = (\lfloor n_s/2 \rfloor + 1) \cdot (2N_{ID}^{cell} + 1) \cdot 2^9 + N_{ID}^{cell} \quad \text{[Equation 4]}$$

In Equation 4, $N_{ID}^{cell}$ indicates a physical layer cell ID, and $n_s$ indicates a slot number within a radio frame.

An orthogonal sequence $[w(0) \ldots w(N_{SF}^{PHICH}-1)]$ used to spread a PHICH is given as in the following table. Here, $n_{PHICH}^{seq}$ corresponds to a PHICH number within a PHICH group.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Referring back to FIG. 6, at step S140, the spread symbols are subject to layer mapped according to the rank and then precoded.

That is, the modulation symbols $d(0), \ldots, d(M_{symb}-1)$ are first aligned according to a RE group size, so $d^{(0)}(0), \ldots, d^{(0)}(c \cdot M_{symb}-1)$ are generated. Here, c is 1 in a normal CP and 2 in an extended CP. In the case of a normal CP, $d^{(0)}(i) = d(i)$, and $i = 0, \ldots, M_{symb}-1$. In the case of an extended CP, the following equation is obtained.

$$[d^{(0)}(4i) \; d^{(0)}(4i+1) \; d^{(0)}(4i+2) \; d^{(0)}(4i+3)]^T = \quad \text{[Equation 5]}$$
$$\begin{cases} [d(2i) \; d(2i+1) \; 0 \; 0]^T & n_{PHICH}^{group} \bmod 2 = 0 \\ [0 \; 0 \; d(2i) \; d(2i+1)]^T & n_{PHICH}^{group} \bmod 2 = 1 \end{cases}$$

In Equation 5, $i = 0, \ldots, (M_{symb}/2)-1$.

The modulation symbols $d^{(0)}(0), \ldots, d^{(0)}(c \cdot M_{symb}-1)$ are mapped to layers and precoded, so a vector, such as the following equation is generated.

$$y(i) = [y^{(0)}(i) \ldots y^{(P-1)}(i)]^T, i=0, \ldots, c \cdot M_{symb}-1 \quad \text{[Equation 6]}$$

In Equation 6, $y^{(p)}(i)$ indicates a signal for an antenna port p. Furthermore, $p = 0, \ldots, P-1$. P indicates the number of cell-specific RSs, and $P \in \{1, 2, 4\}$.

The layer mapping and precoding are dependent on the length of a CP and the number of antenna ports used in PHICH transmission. The PHICH can be transmitted on the same antenna port set as a physical broadcast channel (PBCH).

Regarding transmission using a single antenna port (i.e., P=1), layer mapping and precoding can be performed according to Paragraphs 6.3.3.1 and 6.3.4.1 of 3GPP TS 36.211 V9.1.0. Here, $M_{symb}^{(0)} = c \cdot M_{symb}$.

Regarding transmission using 2 antenna ports (i.e., P=2), layer mapping and precoding can be performed according to Paragraphs 6.3.3.3 and 6.3.4.3 of 3GPP TS 36.211 V9.1.0. Here, $M_{symb}^{(0)} = c \cdot M_{symb}$.

Regarding transmission using 4 antenna ports (i.e., P=4), layer mapping can be performed according to Paragraph 6.3.3.3 of 3GPP TS 36.211 V9.1.0. Here, $M_{symb}^{(0)} = c \cdot M_{symb}$. Furthermore, precoding is performed as in Table 3 below.

TABLE 3

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \\ 0 & 0 & 0 & 0 & 0 & 0 & 0 & 0 \end{bmatrix} \begin{bmatrix} \operatorname{Re}(x^{(0)}(i)) \\ \operatorname{Re}(x^{(1)}(i)) \\ \operatorname{Re}(x^{(2)}(i)) \\ \operatorname{Re}(x^{(3)}(i)) \\ \operatorname{Im}(x^{(0)}(i)) \\ \operatorname{Im}(x^{(1)}(i)) \\ \operatorname{Im}(x^{(2)}(i)) \\ \operatorname{Im}(x^{(3)}(i)) \end{bmatrix}$$

Table 3 corresponds to the case where $(i+n_{PHICH}^{group}) \bmod 2 = 0$ in a normal CP or Equation 7 below is satisfied in an extended CP. $n_{PHICH}^{group}$ is a PHICH group number, and $i = 0, 1, 2$. 'mod' refers to a modulus operation.

$$(i + \lfloor n_{PHICH}^{group}/2 \rfloor) \bmod 2 = \quad \text{[Equation 7]}$$

In other cases, precoding is performed as in Table 4 below.

TABLE 4

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 0 & 0 & 0 & 0 & 0 & 0 & 0 & 0 \\ 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \operatorname{Re}(x^{(0)}(i)) \\ \operatorname{Re}(x^{(1)}(i)) \\ \operatorname{Re}(x^{(2)}(i)) \\ \operatorname{Re}(x^{(3)}(i)) \\ \operatorname{Im}(x^{(0)}(i)) \\ \operatorname{Im}(x^{(1)}(i)) \\ \operatorname{Im}(x^{(2)}(i)) \\ \operatorname{Im}(x^{(3)}(i)) \end{bmatrix}$$

Referring back to FIG. 6, at step S150, the layer-mapped symbols are mapped to respective REs.

For example, a sequence for each PHICH group can be defined as in the following equation.

$$\bar{y}^{(p)}(n) = \sum_i y_i^{(p)}(n) \quad \text{[Equation 8]}$$

An addition operation of Equation 8 is performed on all the PHICHs within the PHICH group, and $y^{(p)}_i(n)$ indicates a symbol sequence for an $i^{th}$ PHICH within the PHICH group.

The PHICH groups are mapped to PHICH mapping units.

In the case of a normal CP, the mapping of a PHICH group m to a PHICH mapping unit m' is defined as in the following equation. A frame structure type 1 is a frame used in FDD, and a frame structure type 2 is a frame used in TDD. For the frame structure types, reference can be made to section 4 of 3GPP TS 36.211 V8.6.0 (2009-03).

$$\tilde{y}_{m'}^{(p)}(n) = \overline{y}_m^{(p)}(n) \quad \text{[Equation 9]}$$

$$m' = $$

$$m = \begin{cases} 0, 1, \ldots, N_{PHICH}^{group} - 1 & \text{for frame structure type1} \\ 0, 1, \ldots, m_i \cdot N_{PHICH}^{group} - 1 & \text{for frame structure type2} \end{cases}$$

In the case of an extended CP, the mapping of PHICH groups m and m+1 to the PHICH mapping unit m' is defined as in the following equation.

$$\tilde{y}_{m'}^{(p)}(n) = \overline{y}_m^{(p)}(n) + \overline{y}_{m+1}^{(p)}(n) \quad \text{[Equation 10]}$$

$$m' = m/2$$

$$m = $$

$$\begin{cases} 0, 2, \ldots, N_{PHICH}^{group} - 2 & \text{for frame structure type1} \\ 0, 2, \ldots, m_i \cdot N_{PHICH}^{group} - 2 & \text{for frame structure type2} \end{cases}$$

In Equations 9 and 10, $m_i$ is given by Table 1.

For example, it is assumed that $z^{(p)}(i)$ indicates '4 symbols' (i.e., symbol quadruplet) i, such as Equation 11 below for an antenna port p.

$$z^{(p)}(i) = \langle \tilde{y}^{(p)}(4i), \tilde{y}^{(p)}(4i+1), \tilde{y}^{(p)}(4i+2), \tilde{y}^{(p)}(4i+3) \rangle \quad \text{[Equation 11]}$$

It can be defined that mapping to REs is performed through the following step using the 4 symbols.

Step 1: for each l' value

Step 2: it is assumed that is the number of RE groups not allocated to a PCFICH in an OFDM symbol l'.

Step 3: the RE groups not allocated to a PCFICH in the OFDM symbol l' are numbered from 0 to $n_{l'}-1$ starting from an RE group having an index of the lowest frequency domain.

Step 4: m' is reset to 0. That is, a PHICH mapping unit number is reset.

Step 5: i=0, 1, 2, for each value

Step 6: 4 symbols $z^{(p)}(i)$ from the PHICH mapping unit m' are mapped to an RE group indicated by $(k', l')_i$. Here, $l'_i$ is a time domain index, and $k'_i$ is a frequency domain index. $k'_i$ and $l'_i$ can be given as in the following equation. In Equation 12, normal PHICH duration and extended PHICH duration comply with Table 5.

[Equation 12]

$$l'_i = \begin{cases} 0 & \text{normal } PHICH \text{ duration, all subframes} \\ (\lfloor m'/2 \rfloor + i + 1) \bmod 2 & \text{extended } PHICH \text{ duration, } MBSFN \text{ subframes} \\ (\lfloor m'/2 \rfloor + i + 1) \bmod 2 & \text{extended } PHICH \text{ duration, subframe 1 and 6 in frame structure type 2} \\ i & \text{otherwise} \end{cases}$$

The frequency domain index $k'_i$ is set to an RE group to which IT has been allocated. $\overline{n}_i$ is given as in Equation 13 or Equation 14. Equation 13 regulates $\overline{n}_i$ relation to extended PHICH duration in the subframes 1 and 6 of a radio frame used in TDD or extended PHICH duration in an MBSFN subframe.

$$\overline{n}_i = \begin{cases} (\lfloor N_{ID}^{cell} \cdot n_{l'_i}/n_1 \rfloor + m') \bmod n_{l'_i} & i = 0 \\ (\lfloor N_{ID}^{cell} \cdot n_{l'_i}/n_1 \rfloor + m' + \lfloor n_{l'_i}/3 \rfloor) \bmod n_{l'_i} & i = 1 \\ (\lfloor N_{ID}^{cell} \cdot n_{l'_i}/n_1 \rfloor + m' + \lfloor 2n_{l'_i}/3 \rfloor) \bmod n_{l'_i} & i = 2 \end{cases} \quad \text{[Equation 13]}$$

In other cases, $\overline{n}_i$ is given as in Equation 14.

$$\overline{n}_i = \begin{cases} (\lfloor N_{ID}^{cell} \cdot n_{l'_i}/n_0 \rfloor + m') \bmod n_{l'_i} & i = 0 \\ (\lfloor N_{ID}^{cell} \cdot n_{l'_i}/n_0 \rfloor + m' + \lfloor n_{l'_i}/3 \rfloor) \bmod n_{l'_i} & i = 1 \\ (\lfloor N_{ID}^{cell} \cdot n_{l'_i}/n_0 \rfloor + m' + \lfloor 2n_{l'_i}/3 \rfloor) \bmod n_{l'_i} & i = 2 \end{cases} \quad \text{[Equation 14]}$$

Step 7: m' is increased by 1.

Step 8: Steps 5 to 7 are repeated until all PHICH mapping units are allocated.

The PHICH duration is configured as in the following table in response to a higher layer signal. The PHICH duration indicates the number of OFDM symbols used to send a PHICH.

TABLE 5

| PHICH duration | Non-MBSFN subframes | | MBSFN subframes |
| --- | --- | --- | --- |
| | Subframes 1 and 6 (TDD radio frame) | All other cases | on a carrier supporting PDSCH |
| Normal | 1 | 1 | 1 |
| Extended | 2 | 3 | 2 |

Figure 7:
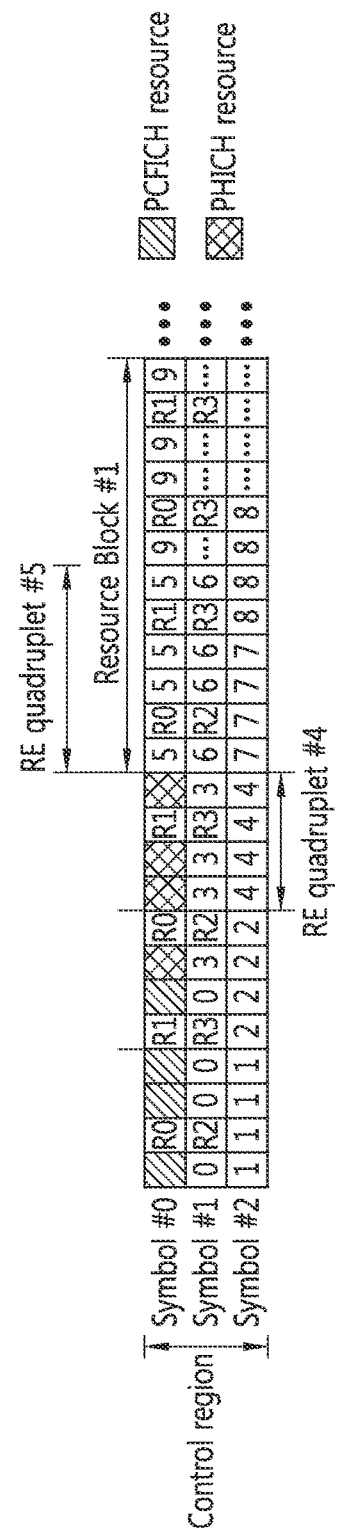
FIG. 7 shows an example in which control channels are mapped to the control region of a downlink subframe.

FIG. 7 shows an example in which control channels are mapped to the control region of a downlink subframe.

In FIG. 7, R0 indicates the reference signal of an antenna port #0, R1 indicates the reference signal of an antenna port #1, R2 indicates the reference signal of an antenna port #2, and R3 indicates the reference signal of an antenna port #3.

The control region includes a plurality of Control Channel Elements (CCEs). The CCE is a logical allocating unit used to provide a coding rate according to the state of a radio channel and can be formed of a plurality of Resource Element Groups (REGs). For example, one CCE can include 9 REGs. One REG is also indicated by an RE quadruplet because it includes 4 Resource Elements (REs). The four REs included in one REG may be contiguous or may not be contiguous to each other. A PHICH can be allocated and mapped by the CCE (or REG) in the first OFDM symbol of a subframe in a normal CP.

<Carrier Aggregation>

A CA system is described below.

Figure 8:
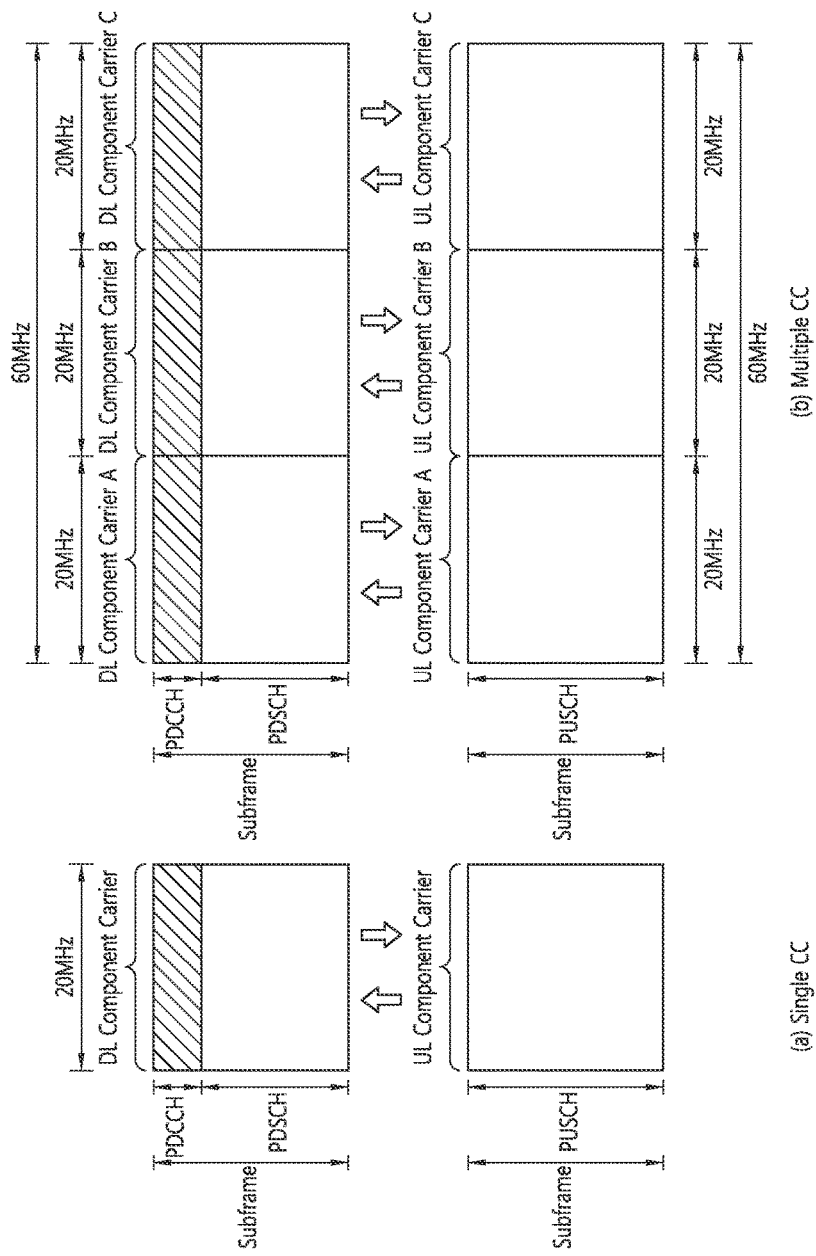
FIG. 8 is a comparison example of an existing single carrier system and a CA system.

FIG. 8 is a comparison example of an existing single carrier system and a CA system.

Referring to FIG. 8, in a single carrier system, only a single carrier is supported for UE in uplink and downlink. The bandwidth of a carrier may be various, but the number of carriers assigned to UE is one. In contrast, in a Carrier Aggregation (CA) system, a plurality of CCs DL CCs A to C and UL CCs A to C may be assigned to UE. A Component Carrier (CC) means a carrier used in a CA system, and it may be abbreviated as a carrier. For example, in order to allocate a bandwidth of 60 MHz to UE, 3 CCs each having 20 MHz may be assigned to the UE.

A CA system may be divided into a contiguous CA system in which aggregated carriers are contiguous to each other and a non-contiguous CA system in which aggregated carriers are separated from each other. When it is simply called a CA system hereinafter, it should be understood that the CA system includes a case where CCs are contiguous and a case where CCS are not contiguous.

A CC, that is, a target when one or more CCs are aggregated, may use bandwidths used in an existing system for backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system may configure a broadband of 20 MHz or higher using only the bandwidths of the 3GPP LTE system. Alternatively, a 3GPP LTE-A system may configure a broadband by defining new bandwidths without using the bandwidths of an existing system.

The system frequency band of a wireless communication system is divided into a plurality of carrier frequencies. In this case, the carrier frequency means the center frequency of a cell. Hereinafter, a cell may mean downlink frequency resources and uplink frequency resources. Alternatively, a cell may mean a combination of downlink frequency resources and optional uplink frequency resources. Furthermore, in general, if a CA is not taken into consideration, a single cell may always include uplink and downlink frequency resources that form a pair.

In order for packet data to be transmitted and received through a specific cell, UE first has to complete a configuration for the specific cell. In this case, the configuration means a state in which the reception of system information necessary to transmit and receive data to and from the specific cell has been completed. For example, the configuration may include an overall process of receiving common physical layer parameters necessary for the transmission/reception of data, Medium Access Control (MAC) layer parameters, or parameters necessary for a specific operation in the RRC layer. A configuration-completed cell is in a state in which the cell may immediately transmit and receive packet data only it has only to receive information about which the packet data may be transmitted.

A cell in the configuration-completed state may be in the activation or deactivation state. In this case, the activation refers to a state in which data is being transmitted or received or a state in which data is ready to be transmitted or received. UE may monitor and receive the control channel (PDCCH) and data channel (PDSCH) of an activated cell in order to check resources (they may be the frequency, the time, etc.) assigned thereto.

Deactivation refers to a state in which traffic data cannot be transmitted or received, but measurement or the transmission/reception of minimum information are possible. UE may receive necessary System Information (SI) in order to receive packets from a deactivated cell. In contrast, the UE does not monitor or receive the control channel (PDCCH) and data channel (PDSCH) of a deactivated cell in order to check resources (they may be a frequency, time, etc.) assigned thereto.

Cells may be classified into a primary cell, a secondary cell, and a serving cell.

The primary cell means a cell that operates in a primary frequency, a cell in which UE performs an initial connection establishment procedure or a connection re-establishment procedure with a BS, or a cell that is indicated as a primary cell in a handover process.

The secondary cell means a cell that operates in a secondary frequency. The secondary cell is configured once RRC establishment is set up and used to provide additional radio resources.

The serving cell is formed of a primary cell in the case of UE in which a Carrier Aggregation (CA) has not been configured or to which a CA cannot be provided. If a CA has been configured for UE, the term 'serving cell' indicates a cell configured for UE and may be plural in this case. One serving cell may include a single DL CC or a pair of {DL CC, UL CC}. A plurality of serving cells may include a primary cell and one of all secondary cells or a set of a plurality of secondary cells.

A Primary Component Carrier (PCC) means a Component Carrier (CC) corresponding to a primary cell. A PCC is a CC through which UE forms connection or RRC connection with a BS at the early stage from among some CCs. A PCC is a special CC that is responsible for connection or RRC connection for signaling regarding a plurality of CCs and that manages UE context, that is, connection information related to UE. Furthermore, a PCC is always in the activation state when it is in RRC connected mode after forming connection or RRC connection with UE. A DL CC corresponding to a primary cell is called a DL Primary Component Carrier (DL PCC), and an UL CC corresponding to a primary cell is called an UL Primary Component Carrier (UL PCC).

A Secondary Component Carrier (SCC) means a CC corresponding to a secondary cell. That is, an SCC is a CC assigned to UE in addition to a PCC and is a carrier extended for additional resource assignment, etc. by UE in addition to a PCC. An SCC may be divided into the activation or deactivation state. A DL CC corresponding to a secondary cell is called a DL Secondary Component Carrier (DL SCC). An UL CC corresponding to a secondary cell is called an UL Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure that is accompanied by a random access channel (RACH) procedure. Fifth, Non-Access Stratum (NAS) information is received through a primary cell. Sixth, in the case of an FDD system, a primary cell is always formed of a pair of a DL PCC and an UL PCC. Seventh, a different CC may be configured as a primary cell in each UE. Eighth, a primary cell may be replaced through only a handover process or a cell selection/cell reselection process. In adding a new secondary cell, RRC signaling may be used to transmit system information about a dedicated secondary cell.

In relation to a CC that forms a serving cell, a DL CC may form a single serving cell, or a DL CC and an UL CC may form a single serving cell through connection establishment. However, a serving cell is not formed of only a single UL CC.

The activation/deactivation of a CC has the same concept as the activation/deactivation of a serving cell. For example, assuming that a serving cell1 is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a CA system can support a plurality of CCs, that is, a plurality of serving cells.

Such a CA system can support non-cross-carrier scheduling and cross-carrier scheduling.

Figure 9:
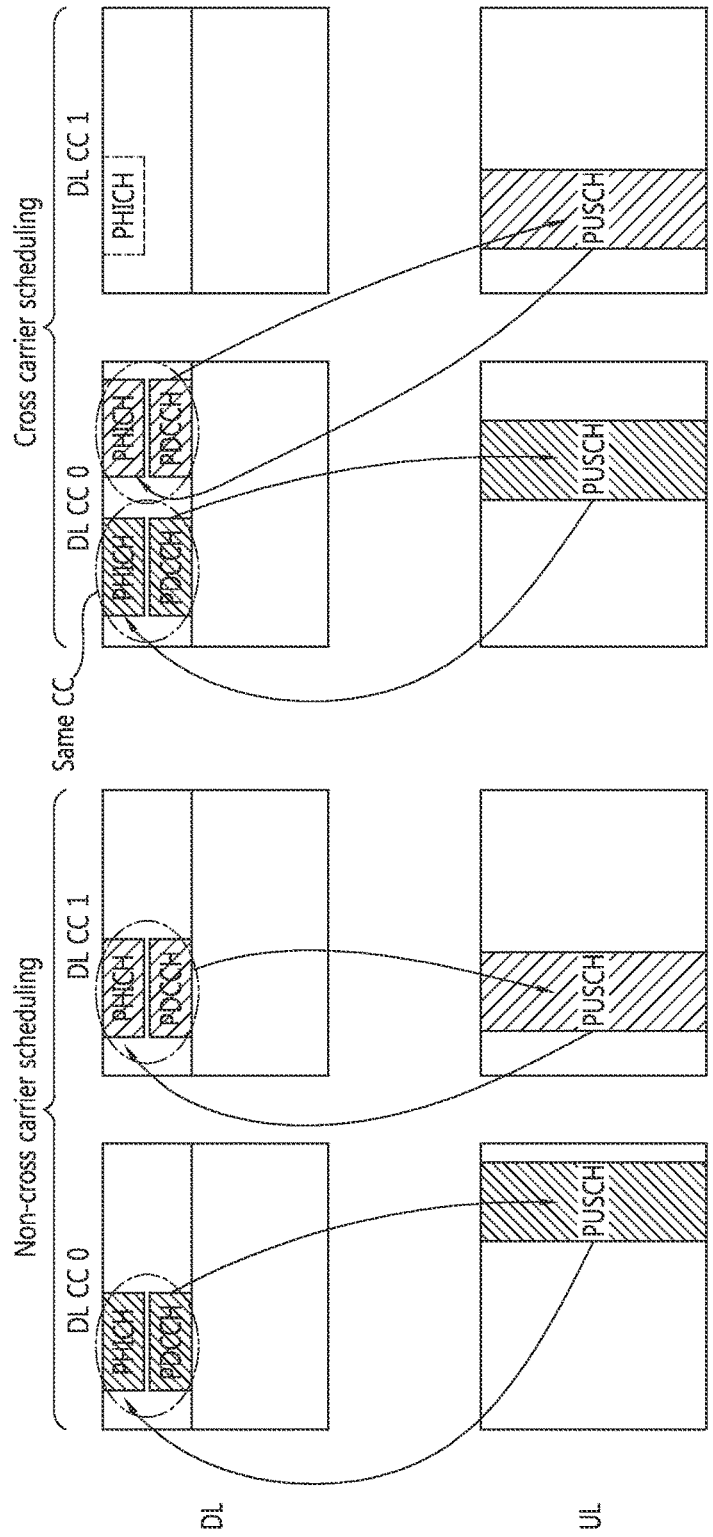
FIG. 9 illustrates non-cross-carrier scheduling and cross-carrier scheduling.

FIG. 9 illustrates non-cross-carrier scheduling and cross-carrier scheduling.

Non-cross-carrier scheduling may be said to be a method of simply extending and applying a conventional scheduling method in a single cell to a plurality of cells. If there is a PDSCH scheduled by a PDCCH, the PDCCH/PDSCH is transmitted through the same CC, and the PDCCH may schedule a PUSCH transmitted through a CC basically linked to a specific CC.

Cross-carrier scheduling is a scheduling method capable of performing the resource assignment of PDSCHs transmitted through different CCs and/or the resource assignment of PUSCHs transmitted through CCs other than CCs basically linked to a specific CC, through a PDCCH transmitted through the specific CC. That is, a PDCCH and a PDSCH may be transmitted through different DL CCs, and a PUSCH may be transmitted through another UL CC other than an UL CC that is linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A CA system supporting cross-carrier scheduling may include a CIF in a conventional Downlink Control Information (DCI) format. In a system supporting cross-carrier scheduling, for example, in an LTE-A system, 3 bits may be extended because a CIF is added to an existing DCI format (i.e., a DCI format used in LTE). In the structure of a PDCCH, an existing coding method and resource assignment method (i.e., resource mapping based on a CCE) may be reused.

A control region which may be added to an existing control region (e.g., a control region used in LTE) is described below. The control region that may be added is called an enhanced (E)-control region, for convenience sake. The E-control region may be a radio resource region added in order to send increased control information in an existing wireless communication system.

Figure 10:
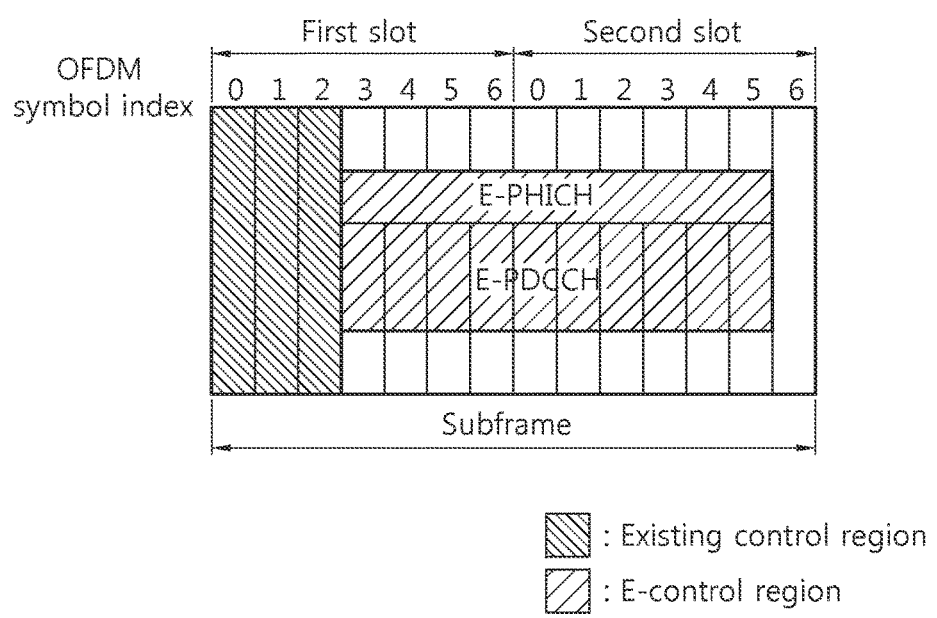
FIG. 10 shows an added E-control region in accordance with an embodiment of the present invention.

FIG. 10 shows an added E-control region in accordance with an embodiment of the present invention.

Referring to FIG. 10, the E-control region may be placed next to an existing control region, when it is viewed in a time domain. For example, if the existing control region is transmitted in the first 3 OFDM symbols of a subframe, the E-control region may be added to OFDM symbols next to the 3 OFDM symbols. When the E-control region is viewed in a frequency domain, the existing control region and the E-control region may be overlapped or may be differently configured. FIG. 10 shows an example in which the E-control region is configured in only part of the frequency band of the existing control region.

In the E-control region, a signal for advanced UE may be transmitted. The advanced UE mean UE capable of signal transmission and reception according to the present invention. Existing UE means UE operating in accordance with current communication standards. In other words, existing UE may be first type UE operating in accordance with a first radio access technology (RAT), for example, 3GPP LTE Rel-10. Advanced UE may be second type UE operating in accordance with a second RAT, for example, 3GPP LTE Rel-11. In this case, the second RAT may be the evolution of the first RAT.

In the E-control region, for example, a control channel for advanced UE may be transmitted. The control channel for advanced UE is called an E-control channel in order to distinguish it from a control channel for existing UE. The E-control channel may include an E-PDCCH, an E-PCFICH, and an E-PHICH. Hereinafter, a PDCCH, a PCFICH, and a PHICH mean existing control channels, and an E-PDCCH, an E-PCFICH, and an E-PHICH mean control channels added according to the present invention.

Hereinafter, an area X means a radio resource area in which a channel X is transmitted from a standpoint of a BS and means a radio resource area in which a channel X is received from a standpoint of UE. For example, an E-PHICH region means a radio resource area in which an E-PHICH is transmitted.

A reference signal not used by existing UE may be used in an E-control region. Advanced UE may receive a signal in an E-control region using a reference signal not used by existing UE.

An E-PHICH region and an E-PDCCH region may be divided in a frequency domain and transmitted. That is, an E-PHICH region and an E-PDCCH region may be subject to frequency division multiplexing (FDM).

Furthermore, an E-PHICH region and an E-PDCCH region may be subject to TDM and FDM within an E-control region. That is, an E-PHICH may be transmitted in a resource region, including some of OFDM symbols forming an E-control region in a time domain and some of resource blocks (or subcarriers) forming an E-control region in a frequency domain. An E-PHICH region and an E-PDCCH region may be separated and configured.

The present invention is now described.

In a prior art, a PHICH is transmitted in a PDCCH region. However, in the future wireless communication system, the use of a new carrier type (NCT) is taken into consideration. The NCT means a carrier using a channel structure different from the channel structure of an existing legacy carrier type (LCT). The NCT may not include a PDCCH region. That is, the NCT may be chiefly used for data transmission. In this case, to include PDCCHs in all the subframes may be the waste of resources. Accordingly, unlike in the LCT, in the NCT, a PDCCH region is not included in a subframe, and a new control channel for sending control information may be inserted into a data region in which data is transmitted, if necessary. The new control channel may be the aforementioned E-PDCCH, for example.

As described above, a PHICH may also not be present because the existing PDCCH region is not present in the NCT. In a prior art, it has been regulated that ACK/NACK for the uplink data transmission of UE are transmitted through a PHICH. In this case, PHICH resources used for ACK/NACK transmission are defined by a PHICH group and PHICH sequence. However, there is a problem in that such a conventional rule is unable to be identically used because a PHICH itself is not present in the NCT.

Furthermore, even in the existing LCT, ACK/NACK may be transmitted without using a PHICH depending on a subframe. For example, in a specific subframe, ACK/NACK may be transmitted through an E-PHICH. Even in this case, it may be difficult to identically use a conventional method of sending ACK/NACK through a PHICH.

In order to solve such a problem, the present invention provides a method of sending ACK/NACK through downlink control information (DCI) without using an ACK/NACK-dedicated channel, that is, a PHICH.

Figure 11:
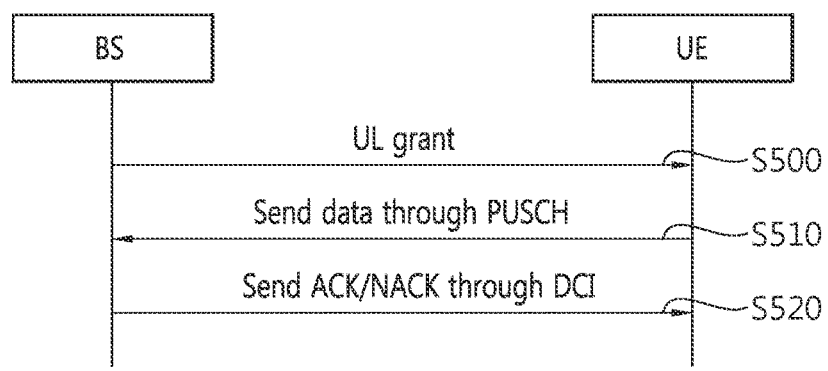
FIG. 11 shows a method of receiving ACK/NACK in accordance with an embodiment of the present invention.

FIG. 11 shows a method of receiving ACK/NACK in accordance with an embodiment of the present invention.

Referring to FIG. 11, a BS sends an UL grant to UE (S500). The UE sends data to the BS through a PUSCH (S510). The PUSCH may have been scheduled by the UL grant. The BS sends ACK/NAC through DCI (S520). The ACK/NACK is a response to the PUSCH, more specifically, a transport block or codeword included in the PUSCH.

A method of sending ACK/NACK through DCI is described in detail below. An ACK/NACK response to PUSCH transmission is abbreviated as an HARQ indicator (HI), for convenience sake.

Figure 12:
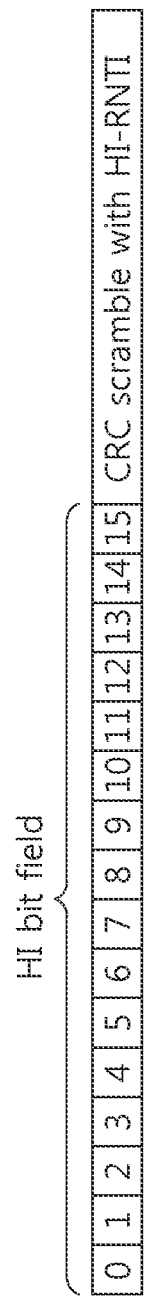
FIG. 12 shows an example of a DCI format in which an HI is transmitted.

FIG. 12 shows an example of a DCI format in which an HI is transmitted.

Referring to FIG. 12, the DCI format may include a control data field and CRC. The control data field may include an HI bit field in which an HI for PUSCHs allocated to a plurality of pieces of UE may be multiplexed and transmitted.

That is, HIs for a plurality of pieces of UE may be multiplexed with a single piece of DCI and transmitted.

Each piece of UE needs to detect ACK/NACK information about the UE within DCI. In this case, how the UE will detect the ACK/NACK information may be problematic. Two methods may be taken into consideration. That is, the two methods include a method capable of using a mapping relationship between an existing PHICH group, a PHICH sequence pair, and PHICH resources and a method of defining a new mapping relationship between a PUSCH and an HI bit field.

I. A Method Using an Existing PHICH Group, a PHICH Sequence Pair, and a Mapping Relationship Between PHICH Resources.

Figure 13:
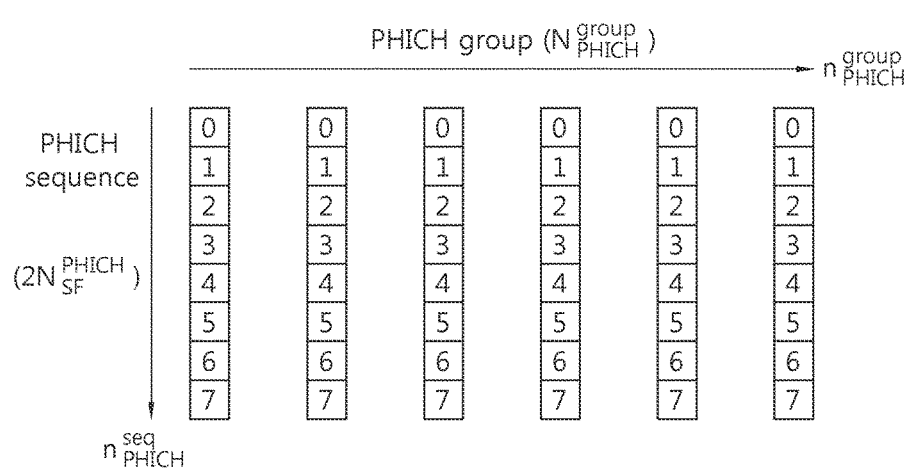
FIG. 13 shows an example of mapping between an existing PHICH group, a PHICH sequence pair, and PHICH resources.

FIG. 13 shows an example of mapping between an existing PHICH group, a PHICH sequence pair, and PHICH resources.

Referring to FIG. 13, there is a plurality of PHICH resources in which an HI may be transmitted. The plurality of PHICH resources consists of $N^{group}_{PHICH}$ PHICH groups. Each of the PHICH groups may include $2N^{PHICH}_{SF}$ PHICH resources. In this case, a specific one of the plurality of PHICH resources is indicated by a PHICH group index $n^{group}_{PHICH}$ and a PHICH sequence index $n^{seq}_{PHICH}$ within the PHICH group.

Furthermore, the PHICH group index and the PHICH sequence index may be determined based on a combination of $I^{lowest\_index}_{PRB\_RA}$, that is, a minimum index of an allocated PUSCH, and an $n_{DMRS}$ value, that is, a DMRS cyclic shift included in an UL grant which schedules a PUSCH.

If MIMO is applied to uplink, two codewords may be transmitted in one PUSCH. In this case, HIs for the two codewords may need to be transmitted in a PHICH. In this case, PHICH resources in which the HI for the second codeword is transmitted may be determined based on a value obtained by adding 1 to a minimum index of a PUSCH.

A specific bit field within DCI may be indicated using the conventional mapping rule between a PHICH group index and a PHICH sequence index pair and PHICH resources.

Figure 14:
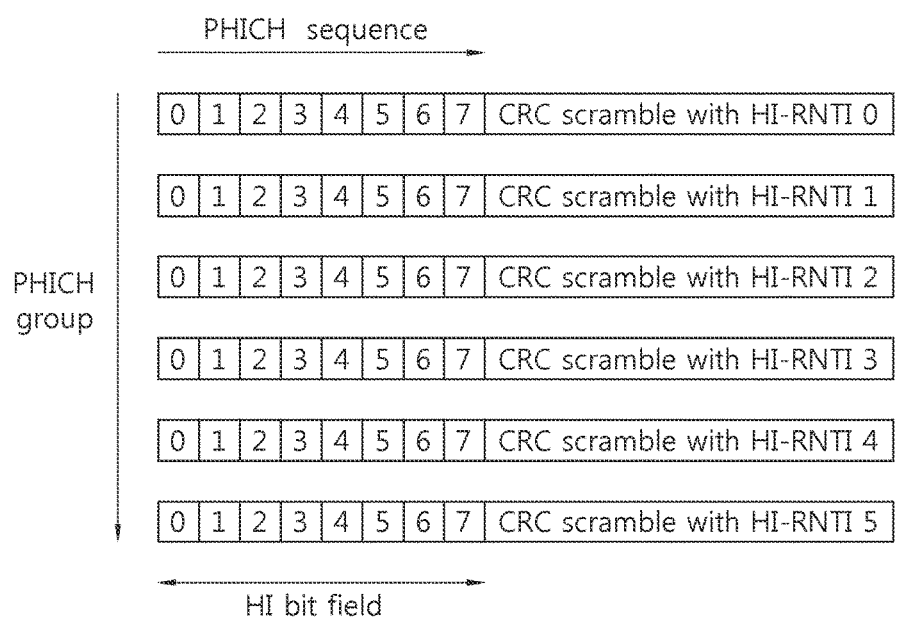
FIG. 14 shows an example of a method of indicating a specific bit field within DCI in accordance with an embodiment of the present invention.

FIG. 14 shows an example of a method of indicating a specific bit field within DCI in accordance with an embodiment of the present invention.

Referring to FIG. 14, a plurality of pieces of DCI in which HIs are able to be transmitted may be present. For example, pieces of DCI equal to the number of PHICH groups $N^{group}_{PHICH}$ may be present. Furthermore, each piece of DCI may have an HI bit field equal to the PHICH sequence's length $2N^{PHICH}_{SF}$ and also have a CRC field. Each piece of DCI may be subject to CRC scrambling with a different HI-RNTI. The HI-RNTI is indicative of an RNTI used in DCI for sending an HI.

In this case, specific DCI may be indicated by the value of a PHICH group index $n^{group}_{PHICH}$, and a specific bit within the specific DCI may be indicated by a PHICH sequence index $n^{seq}_{PHICH}$ within a PHICH group.

In this method, if the PHICH sequence's length is short, a large number of pieces of DCI may need to be generated depending on the number if PHICH groups. Furthermore, overhead may occur in CRC added to each piece of DCI.

FIG. 15 shows an example of another method of indicating a specific bit field within DCI in accordance with an embodiment of the present invention.

Referring to FIG. 15, there are DCI 0 subject to CRC scrambling with an HI-RNTI 0 and DCI 1 subject to CRC scrambling with an HI-RNTI 1. Each of the pieces of DCI may be mapped to a plurality of PHICH groups. For example, the DCI 0 may be mapped to PHICH groups 0, 1, and 2, and the DCI 1 may be mapped to PHICH groups 3, 4, and 5.

If a PHICH group index $n^{group}_{PHICH}$ is given, UE may be aware that the PHICH group index is indicative of which DCI. For example, if a PHICH group index is indicative of a PHICH group 1, it may be aware that the PHICH group index is indicative of DCI 0. Furthermore, it may be aware that which one of bits mapped to a PHICH group 1 includes an HI based on a PHICH sequence index $n^{seq}_{PHICH}$ within the PHICH group.

The number of HI-RNTIs may be directly known through an RRC signal or may be determined based on the number of PHICH groups determined by the length of DCI and Ng.

The length of DCI in which an HI is transmitted may be the same as that of another DCI which shares the same search space. This is for preventing a blind decoding number from increasing due to DCI in which an HI is transmitted.

It is assumed that the length of DCI in which an HI is transmitted is B (bits). In this case, the B bits may be indicative of the size of an HI bit field other than CRC. In this case, the number of RNTIs may be determined as in the following equation.

$$[(N^{group}_{PHICH} \cdot 2N^{PHICH}_{SF})/B] \qquad \text{[Equation 15]}$$

Meanwhile, if B is not a positive number times the PHICH sequence's length, a single PHICH group may be transmitted through different DCI. That is, a single PHICH group is not mapped to a single piece of DCI, but may be mapped to two pieces of DCI. The two pieces of DCI may be scrambled with different RNTIs.

In order for a single PHICH group to be mapped to different DCI, the value of B may be limited so that it becomes a positive number times the PHICH sequence's length.

In this case, the number of RNTIs may be determined as in the following equation.

$$\lceil (N_{PHICH}^{group} \cdot 2N_{SF}^{PHICH})/(\lfloor B/2N_{SF}^{PHICH}\rfloor \cdot 2N_{SF}^{PHICH})\rceil \qquad \text{[Equation 16]}$$

In this case, the remaining bit field may be used as virtual CRC, or the cyclic shift value of the HI of the first PHICH group of DCI may be used. In the case of DCI corresponding to the last RNTI, the number of PHICH groups may be insufficient.

The number of PHICH groups may be determined by the number of DL resource blocks. More preferably, the number of PHICH groups may be determined by the number of UL resource blocks, but a PDSCH in which the SIB is transmitted may be detected after the number of PHICH groups is checked using Ng and a PDCCH is configured because the number of UL resource blocks is transmitted as an SIB.

If a point of time at which a parameter that determines the number of PHICH resources, such as Ng, is applied is the same as a point of time at which the number of UL resource blocks is checked or is after the point of time, the number of UL resource blocks may be preferably applied.

That is, if an E-PHICH is transmitted through a PDSCH region or an E-PDCCH region or in the form of DCI transmitted as the PDCCH of an existing PDCCH region other than the PHICH resources of the existing PDCCH region, the number of PHICHs may be determined by the number of UL resource blocks.

If a plurality of PHICH groups and a single RNTI are mapped as in FIG. 15, the waste of DCI may be generated if only some PHICH groups are used. For example, it is assumed that the PHICH groups 0, 1, and 2 have been mapped so that they are transmitted in DCI 0 scrambled with an HI-RNTI 0 and the PHICH groups 3, 4, and 5 have been mapped so that they are transmitted in DCI 1 scrambled with an HI-RNTI 1. In this case, if the PHICH groups 0, 2, and 3 are used for HI transmission, two pieces of DCI need to be used although the three PHICH groups are able to be transmitted through a single piece of DCI.

Accordingly, a method of reducing the waste of DCI by diversifying HI-RNTIs according to a combination of PHICH groups may be taken into consideration.

For example, if the number of PHICH groups is 6 and three PHICH groups are transmitted in a single piece of DCI, a combination for selecting 3 PHICH groups of the 6 PHICH groups (i.e., $_6C_3$=20) is 20 in total. If the 20 combinations are respectively mapped to 20 HI-RNTIs, there is an advantage in that DCI can be configured depending on a required combination. A plurality of RNTI resources needs to be reserved, but there is an advantage in that the number of pieces of DCIs actually occupying physical resources can be reduced.

Furthermore, a blind decoding number is not increased because only an RNTI scrambled after the decoding of DCI has only to be compared. The correspondence of a combination of an HI-RNTI and a PHICH group may be performed according to an agreed rule or signaling. Signaling may be based on a high layer signal, such as an RRC message. An HI-RNTI may be allocated to all the combinations of PHICH groups, but an HI-RNTI may be allocated to only some combinations in order to properly maintain a burden in al locating HI-RNTIs.

Meanwhile, if the number of PHICH groups corresponding to one HI-RNTI is determined, a corresponding relationship between a PHICH group number and an HI-RNTI may be determined as follows.

Order of HI-RNTIs or order of PHICH groups may be made identical. For example, the smallest value of an HI-RNTI may correspond to the smallest value of a PHICH group.

If an HI-RNTI is signaled through an RRC message, PHICH groups may be sequentially mapped in order of the HI-RNTI field.

Meanwhile, in the case of TDD, the number of UL subframes may be greater than the number of DL subframes within a single frame according to an UL-DL configuration (e.g., an UL-DL configuration 0).

In this case, an HI for the PUSCH of two UL subframes needs to be transmitted in a single DL subframe. To this end, in the corresponding subframe, PHICH resources, that is, $I_{PHICH}$=1, are configured, and the number of PHICH groups becomes twice. The value of $N^{group}_{PHICH}$ is the number of PHICH groups corresponding to a single UL subframe, and a total number of PHICH groups in a plurality of DL subframes is $2N^{group}_{PHICH}$.

To this end, the value of an HI-RNTI may be signaled through an RRC message, or a value obtained by adding an offset value to the value of a PHICH group if $I_{PHICH}$=0 may be selected. The offset value may be a total number of HI-RNTIs if $I_{PHICH}$=0.

Alternatively, a method of maintaining the number of PHICH groups and adding an offset using a cyclic shift to a selected value of a PHICH group may be used. For example, the following method may be used.

$$n_{PHICH}^{group}=(I_{PRB\_RA}+n_{DMRS}+I_{PHICH}\\ N_{PHICH}^{group\text{-}offset})\bmod N_{PHICH}^{group} \qquad \text{[Equation 17]}$$

In the above equation, an offset for selecting a PHICH group of $I_{PHICH}$=1 may include selecting PHICH groups within the same DCI. This is for enabling a single piece of UE to detect only a single piece of DCI.

Meanwhile, if UL MIMO is used, there is a need for HI resources for a second codeword.

A value obtained by adding 1 to the first index of an allocated PUSCH (i.e., $I_{PRB\_RA}=I^{lowest\_index}_{PRB\_RA}+1$) as in a prior art may be used. In this method, a possibility that a PHICH group index and a PHICH sequence index may be transmitted in DCI of different HI-RNTIs is increased because the PHICH group index and the PHICH sequence index are simultaneously changed.

Accordingly, an offset within PHICH groups transmitted with the same HI-RNTI may be applied, or an offset may be applied to the selection of a PHICH sequence index without applying the offset in using the same PHICH group index. A single piece of UE may be made to detect only a single piece of DCI.

An example in which a (PHICH group index, PHICH sequence index) pair and an HI bit field within DCI are mapped using a mapping rule between the (PHICH group index, PHICH sequence index) pair and PHICH resources has been described. In this case, the PHICH group index and PHICH sequence index is determined based on a minimum resource block index $I^{lowest\_index}_{PRB\_RA}$ forming a PUSCH and a DMRS cyclic shift value $n_{DMRS}$ included in an uplink grant which schedules the PUSCH. Accordingly, the HI bit field may be said to be determined based on $I^{lowest\_index}_{PRB\_RA}$ and $n_{DMRS}$.

A new mapping rule of a PUSCH and an HI bit field is described below.

II. Mapping Rule of a PUSCH and an HI Bit Field

In DCI in which a plurality of HIs is multiplexed and joint-coded, to apply a PHICH group classified based on a resource element group (REG) is inefficient. Accordingly, PHICH resources may be divided for each HI-RNTI instead of a PHICH group.

Figure 16:
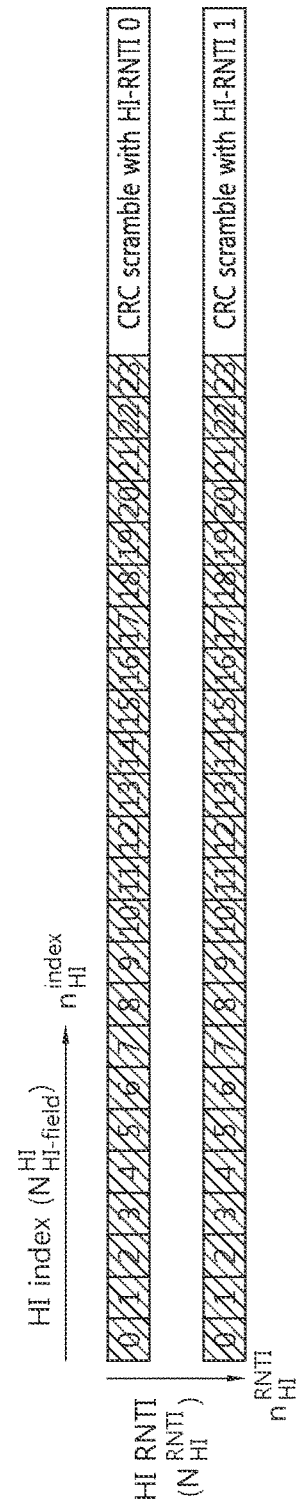
FIG. 16 shows an example of the mapping of a specific HI bit field in a plurality of pieces of DCI.

FIG. 16 shows an example of the mapping of a specific HI bit field in a plurality of pieces of DCI.

It is assumed that the length of the HI bit field of a single piece of DCI is $N^{HI}_{HI\text{-}field}$. The number of RNTIs is assumed to be $N^{RNTI}_{HI}$. The $N^{RNTI}_{HI}$ may be determined as follows.

$$\lceil N_g(N_{RB}^{DL}/N_{HI\text{-}field}^{HI}) \rceil \quad \text{[Equation 18]}$$

$N^{HI}_{HI\text{-}field}$ may be a predetermined value or a value signaled through an RRC message. Alternatively, $N^{HI}_{HI\text{-}field}$ may be a value determined based on a frequency band or may be the size of an information field of a specific DCI format. $N^{DL}_{RB}$ is the number of resource blocks allocated to downlink and may be substituted with $N^{UL}_{RB}$, that is, the number of resource blocks allocated to uplink.

The number of RNTIs may have value having 2, 3, or 5, that is, a PUSCH allocation unit, as a radix or a multiple value of 2, 3, or 5. The reason or this is that if 2 or more resource blocks are allocated, a PUSCH scheduling unit has a value having 2, 3, or 5 as a radix. Accordingly, if such a method is used, the utilization of PUSCH and HI correspondence resources can be increased. That is, resources not frequently used are collected in the DCI of a specific HI-RNTI based on a PUSCH allocation unit, thereby being capable of reducing the transmission of DCI for an HI.

In accordance with the method of FIG. 16, where ACK/NACK for specific UE is placed in which bit within what DCI may be identified based on an index ($n^{RNTI}_{HI}$) indicative of an RNTI and an index ($n^{index}_{HI}$) indicative of a specific bit in the HI bit field.

Meanwhile, the selection of $n^{RNTI}_{HI}$ and $n^{index}_{HI}$ according to $I_{PRB\_RA}$ and $n_{DMRS}$ values may be determined as follows.

$n^{RNTI}_{HI}$ is a value assigned to each configured HI-RNTI in predetermined order. Order of HI-RNTIs to be used may be determined as follows.

HI-RNTI values may be sequentially (e.g., in order of an increasing value of HI-RNTI) mapped. Alternatively, if an HI-RNTI is signaled through an RRC message, PHICH groups may be sequentially mapped in order of HI-RNTI fields.

If resources change to next resources in the last HI-RNTI resources, the resources may be cyclically shifted to the first resources and applied.

An increase of 1 of the sum of the values $I_{PRB\_RA}$, $n_{DMRS}$ may be incorporated into a change of $n^{RNTI}_{HI}$.

Similar to the existing method of selecting PHICH group resources, an increase of 1 of the value is incorporated into the selection of an RNTI. If $n_{DMRS}=0$, the consecutive RB index values of PUSCHs may be allocated to different RNTIs.

That is, since only resources corresponding to a minimum RB index of a PUSCH is used, HI resources corresponding to a PUSCH index other than HI resources corresponding to the minimum index may not be used in other UE.

$n^{RNTI}_{HI}$, $n^{index}_{HI}$ may be determined as in the following equation.

$$n^{RNTI}_{HI} = (I_{PRB\_RA} + n_{DMRS}) \bmod N^{RNTI}_{HI} + I_{PHICH}$$

$$n^{index}_{HI} = (\lfloor I_{PRB\_RA}/N^{RNTI}_{HI} \rfloor + n_{DMRS}) \bmod N^{HI}_{HI\text{-}field} \quad \text{[Equation 19]}$$

Alternatively, values adjacent to the sum of $I_{PRB\_RA}$, $n_{DMRS}$ may be set to be placed in the same $n^{RNTI}_{HI}$ as possible. The adjacent values may be placed in the same $n^{RNTI}_{HI}$ as possible so that DCI resources for an HI can be managed in an uplink resource block.

For example, $n^{RNTI}_{HI}$, $n^{index}_{HI}$ may be determined as in the following equation.

$$n^{RNTI}_{HI} = \lfloor (I_{PRB\_RA} + n_{DMRS})/N^{HI}_{HI\text{-}field} \rfloor \bmod N^{RNTI}_{HI} + I_{PHICH} N^{RNTI}_{HI}$$

$$n^{index}_{HI} = (\lfloor I_{PRB\_RA}/N^{RNTI}_{HI} \rfloor + n_{DMRS}) \bmod N^{HI}_{HI\text{-}field} \quad \text{[Equation 20]}$$

Alternatively, the application of the $n_{DMRS}$ value may be limited to an index in the DCI of the same RNTI. For example, only $I_{PRB\_RA}$ other than $n_{DMRS}$ may be used as an input parameter of $n^{RNTI}_{HI}$. $n_{DMRS}$ may be applied as the input parameter of $n^{index}_{HI}$. That is, the value of $n_{DMRS}$ is set to be placed in the same $n^{RNTI}_{HI}$ so that the value of $n_{DMRS}$ is controlled by taking into consideration only whether HIs collide against each other in a single piece of DCI. That is, as the value of $n_{DMRS}$ is increased, a cyclic shift in the same RNTI may be applied. There is an advantage in that a collision can be avoided more simply if HI resources are insufficiently configured compared to the number of PUSCHs.

For example, $n^{RNTI}_{HI}$, $n^{index}_{HI}$ may be determined as in the following equation.

$$n^{RNTI}_{HI} = \lfloor I_{PRB\_RA}/N^{HI}_{HI\text{-}field} \rfloor \bmod N^{RNTI}_{HI} + I_{PHICH} N^{RNTI}_{HI}$$

$$n^{index}_{HI} = (\lfloor I_{PRB\_RA}/N^{RNTI}_{HI} \rfloor + n_{DMRS}) \bmod N^{HI}_{HI\text{-}field} \quad \text{[Equation 21]}$$

Meanwhile, the selection of HI resources for a second codeword of uplink MIMO may be limited to an index in the DCI of the same RNTI.

Two HI values for two codewords according to UL MIMO are aimed at a single piece of UE. Accordingly, $I^{lowest\_index}_{PRB\_RA}$ is applied as the input parameter of $n^{RNTI}_{HI}$ and $I_{PRB\_RA}$ is applied as the input parameter of $n^{index}_{HI}$ so that the UE is able to decode only a single piece of DCI.

That is, HIs for two codewords correspond to the same RNTI and are divided based on an HI index in the DCI of a corresponding RNTI. If HIs are mapped to DCI of different RNTIs depending on a codeword, there may be ambiguity in a retransmission codeword if some DCI is not received.

$n^{RNTI}_{HI}$, $n^{index}_{HI}$ may be determined as in the following equation.

$$n^{RNTI}_{HI} = \lfloor I^{lowest\_index}_{PRB\_RA}/N^{HI}_{HI\text{-}field} \rfloor \bmod N^{RNTI}_{HI} + I_{PHICH} N^{RNTI}_{HI}$$

$$n^{index}_{HI} = (\lfloor (I^{lowest\_index}_{PRB\_RA} + 1)/N^{RNTI}_{HI} \rfloor + n_{DMRS}) \bmod N^{HI}_{HI\text{-}field} \quad \text{[Equation 22]}$$

Figure 17:
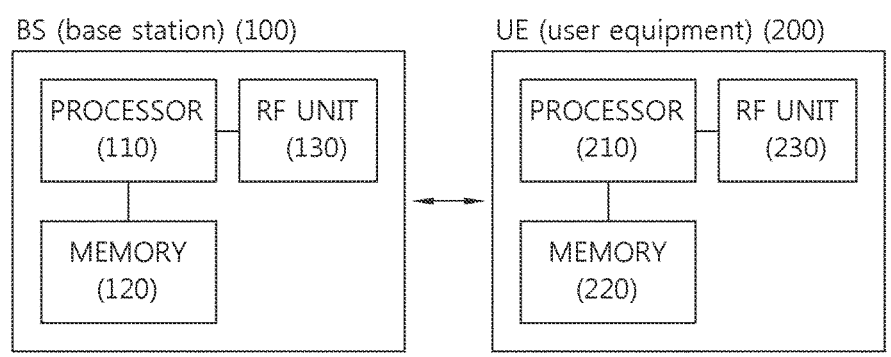
FIG. 17 is a block diagram showing a BS and UE.

FIG. 17 is a block diagram showing a BS and a UE.

The BS 100 includes a processor 110, memory 120, and a radio frequency (RF) unit 130. The processor 110 implements the proposed functions, processes and/or methods. The memory 120 is connected to the processor 110 and stores a variety of pieces of information for driving the processor 110. The RF unit 130 is connected to the processor 110 and sends and/or receives radio signals.

The UE 200 includes a processor 210, memory 220, and an RF unit 230. The processor 210 implements the proposed functions, processes and/or methods. The memory 220 is connected to the processor 210 and stores a variety of pieces of information for driving the processor 210. The RF unit 230 is connected to the processor 210 and sends and/or receives radio signals.

The processor 110, 210 may include Application-Specific Integrated Circuits (ASICs), other chipsets, logic circuits, data processors and/or converters for converting baseband signals and radio signals. The OFDM transmitter and the OFDM receiver of FIG. 7 can be implemented in the processor 110, 210. The memory 120, 220 may include Read-Only Memory (ROM), Random Access Memory (RAM), flash memory, memory cards, storage media and/or other storage devices. The RF unit 130, 230 may include one or more antennas for sending and/or receiving radio signals. When the embodiment is implemented in software, the above-described scheme may be implemented as a module (process, function, etc.) for performing the above function. The module may be stored in the memory 120, 220 and executed by the processor 110, 210. The memory 120, 220 may be placed inside or outside the processor 110, 210 and connected to the processor 110, 210 using a variety of well-known means

What is claimed is:

1. A method of receiving an acknowledgement/not-acknowledgement (ACK/NACK) in a wireless communication system, the method performed by a user equipment (UE) and comprising:
    transmitting uplink data on an uplink subframe; and
    receiving downlink control information (DCI) on a downlink subframe in response to the uplink data,
    wherein the downlink subframe includes only a data region and does not include a control region which is a dedicated region for receiving a control channel, and
    wherein the DCI is received through an enhanced control channel on the data region, and a plurality of ACK/NACKs for the uplink data is included in the DCI when the downlink subframe does not include the control region.

2. The method of claim 1, wherein the DCI includes a radio network temporary indicator (RNTI) which identifies the DCI including the plurality of ACK/NACKs.

3. The method of claim 2, wherein the DCI includes a plurality of physical hybrid automatic repeat request indicator channel (PHICH) groups, and the PHICH groups have identical RNTIs.

4. The method of claim 2, wherein the DCI further includes a hybrid automatic repeat request (HARQ) indicator bit field, in which the plurality of ACK/NACKs are multiplexed, and a cyclic redundancy check (CRC) field, and
    wherein the plurality of ACK/NACKs are transmitted to a plurality of UEs.

5. The method of claim 4, wherein an ACK/NACK for the UE is mapped to a bit on the HARQ indicator bit field.

6. The method of claim 4, wherein the CRC field comprises a CRC scrambled with the RNTI.

7. The method of claim 6, wherein a location of the ACK/NACK within the DCI is identified based on an index indicative of the RNTI and an index of the HARQ indicator bit field.

8. The method of claim 1, wherein if the uplink data comprises two codewords, two ACK/NACKs for the two codewords are received within identical DCI.

9. A user equipment (UE), comprising:
    a radio frequency (RF) unit that transmits and receives radio signals; and
    a processor connected to the RF unit,
    wherein the processor:
        transmits uplink data on an uplink subframe, and
        receives downlink control information (DCI) on a downlink subframe in response to the uplink data,
    wherein the downlink subframe includes only a data region and does not include a control region which is a dedicated region for receiving a control channel, and
    wherein the DCI is received through an enhanced control channel on the data region, and a plurality of ACK/NACKs for the uplink data is included in the DCI when the downlink subframe does not include the control region.

* * * * *